United States Patent
Simpson et al.

(10) Patent No.: US 7,632,435 B2
(45) Date of Patent: Dec. 15, 2009

(54) ACTIVATED CARBON TO IMMOBILIZE PITCH IN CONSTRAINT FIXTURE DURING CARBONIZATION

(75) Inventors: Allen H. Simpson, Buchanan, MI (US); Slawomir T. Fryska, Granger, IN (US); Mark L. La Forest, Granger, IN (US); Barry P. Soos, Mishawaka, IN (US)

(73) Assignee: Honeywell International Inc., Morristown, NJ (US)

( * ) Notice: Subject to any disclaimer, the term of this patent is extended or adjusted under 35 U.S.C. 154(b) by 414 days.

(21) Appl. No.: 11/435,734

(22) Filed: May 18, 2006

(65) Prior Publication Data

US 2006/0280671 A1 Dec. 14, 2006

Related U.S. Application Data

(60) Provisional application No. 60/690,157, filed on Jun. 14, 2005.

(51) Int. Cl.
*C01B 31/00* (2006.01)
(52) U.S. Cl. .................................... 264/29.1
(58) Field of Classification Search ............... 264/29.1, 264/29.5, 643, 671, 673
See application file for complete search history.

(56) References Cited

U.S. PATENT DOCUMENTS

| | | | |
|---|---|---|---|
| 3,249,964 A | 5/1966 | Shaler | |
| 3,265,798 A | 8/1966 | Lyle, Jr. et al. | |
| 3,405,205 A * | 10/1968 | Rowe et al. | 264/105 |
| 3,867,491 A * | 2/1975 | Marin | 264/29.1 |
| 4,567,007 A * | 1/1986 | Harder | 264/29.5 |
| 4,569,835 A * | 2/1986 | Di Cio et al. | 423/445 R |
| 4,657,717 A | 4/1987 | Cattanach et al. | |
| 5,087,193 A | 2/1992 | Herbert, Jr. | |
| 5,609,815 A | 3/1997 | Bauer | |
| 5,686,117 A * | 11/1997 | Snyder et al. | 425/112 |
| 5,916,633 A | 6/1999 | Lackey et al. | |
| 6,033,506 A | 3/2000 | Klett | |
| 6,077,464 A | 6/2000 | Murdie et al. | |
| 6,242,171 B1 | 6/2001 | Gourlaouen | |
| 6,323,160 B1 | 11/2001 | Murdie et al. | |
| 6,447,893 B2 | 9/2002 | Hanzawa et al. | |
| 6,521,152 B1 | 2/2003 | Wood et al. | |
| 6,673,328 B1 | 1/2004 | Klett et al. | |

(Continued)

*Primary Examiner*—Steven P Griffin
*Assistant Examiner*—Erin Snelting
(74) *Attorney, Agent, or Firm*—Birch, Stewart, Kolasch & Birch, LLP

(57) ABSTRACT

Method of carbonizing pitch-infiltrated fibrous annular preform by: infiltrating the preform with pitch; placing the pitch-infiltrated preform in a constraint fixture having an ejector base plate, an inner wall, an outer wall, and a top press plate; selecting the relative sizes of the preform and the constraint fixture so that a layer of inert friable material may be situated between the preform and walls of the constraint fixture; placing inert friable material (e.g., activated carbon) between the preform and the top, bottom, and walls of the constraint fixture; and subjecting the pitch-infiltrated fibrous preform to carbonization in the constraint fixture. The activated carbon or other inert friable material adsorbs pitch molecules that escape the preform during carbonization, which reduces problems with foaming. The layer of activated carbon or other friable material between the fibrous preform and the constraint fixture also provides an easily crushable region that facilitates removal of the preform from the constraint fixture after carbonization.

1 Claim, 5 Drawing Sheets

U.S. PATENT DOCUMENTS

| | | |
|---|---|---|
| 6,780,505 B1 | 8/2004 | Klett et al. |
| 2002/0135090 A1 | 9/2002 | Koren |
| 2003/0015811 A1 | 1/2003 | Klett et al. |
| 2003/0232897 A1 | 12/2003 | Pfister et al. |
| 2004/0033361 A1 | 2/2004 | Hamaguchi |
| 2005/0093188 A1 | 5/2005 | Forest et al. |

* cited by examiner

WITH ACTIVATED CARBON

ACTIVATED CARBON TO IMMOBILIZE PITCH IN CONSTRAINT FIXTURE DURING CARBONIZATION

This application claims priority to provisional application Ser. No. 60/690,157, filed Jun. 14, 2005. All of the disclosure of Ser. No. 60/690,157 is expressly incorporated by reference herein.

FIELD OF THE INVENTION

This invention relates to the carbonization of pitch-infiltrated fibrous preforms. Such pitch infiltrated fibrous preforms are manufactured into carbon-carbon composites having utility in such demanding applications as aircraft brake discs.

BACKGROUND OF THE INVENTION

Carbonization of pitch-infiltrated fibrous preforms during the manufacture of carbon-carbon composites poses many difficulties. Among the difficulties are the phenomena that when the fibrous pitch-infiltrated preform is held in a constraint fixture during a carbonization process, (1) the pitch may bond the preform to the fixture, (2) unequal coefficients of thermal expansion between the preform and an adjacent wall of the constraint fixture may break or stress the preform, and (3) the pitch may foam during carbonization, causing backpressure from the constraint fixture which may break or stress the preform. US 2005/0093188 A1 discloses a method for making a carbon-carbon composite preform using e.g. a steel constraint fixture. The method disclosed therein is operative, but in some cases foaming of pitch causes untidiness in the carbonization furnace. Also, it is sometimes difficult to remove the preform from the constraint fixture due to unwanted bonding.

SUMMARY OF THE INVENTION

The present invention provides embodiments that overcome problems such as those discussed above. In one aspect of the present invention, a friable inert material such as activated carbon is placed between the preform and the constraint fixture. The activated carbon or other inert friable material adsorbs the pitch molecules that escape the preform during carbonization, which reduces problems with foaming. The layer of activated carbon or other friable material between the fibrous preform and the constraint fixture also provides an easily crushable region that facilitates removal of the preform from the constraint fixture after carbonization.

In one embodiment, this invention provides a method of carbonizing a pitch-infiltrated fibrous annular preform by: infiltrating the fibrous annular preform with pitch; placing the pitch-infiltrated annular fibrous preform in a constraint fixture having an ejector base plate, an inner wall, an outer wall, and a top press plate, the relative sizes of the preform and the constraint fixture being selected so that a layer of inert friable material may be situated between the preform and walls of the constraint fixture; placing inert friable material (e.g., activated carbon, typically having a bulk density of from 0.09 g/cc to 0.25 g/cc) between the preform and the top, bottom, and walls of the constraint fixture; and subjecting the pitch-infiltrated fibrous preform to carbonization in the constraint fixture. In the practice of this embodiment of the invention, the relative sizes of the preform and the constraint fixture may be selected to leave a gap of any convenient size (e.g., ⅛ inch to 1 inch) between the preform and the walls of the constraint fixture.

To practice this method of the invention, the step of placing the inert friable material between the preform and the top, bottom, and walls of the constraint fixture may be accomplished, for instance, by dusting a layer of the material up to ¼ inch thick onto the ejector base plate, placing the annular preform on top of the layer of material on the base plate, placing the inner wall inside of the annular preform, placing the outer wall around the outside of the preform, pouring the inert friable material into the gaps between the inner and outer walls of the constraint fixture and the preform, dusting a layer of the material up to ¼ inch thick onto the top of the preform, and placing the top press plate on top of the layer of material on top of the preform.

BRIEF DESCRIPTION OF THE DRAWINGS

The present invention will be more fully understood by reference to the detailed description given hereinbelow and to the accompanying drawings. The drawings are not to scale, and are given by way of illustration only. Accordingly, the drawings should not be construed as limiting the scope of the present invention.

DETAILED DESCRIPTION

Figure 1:
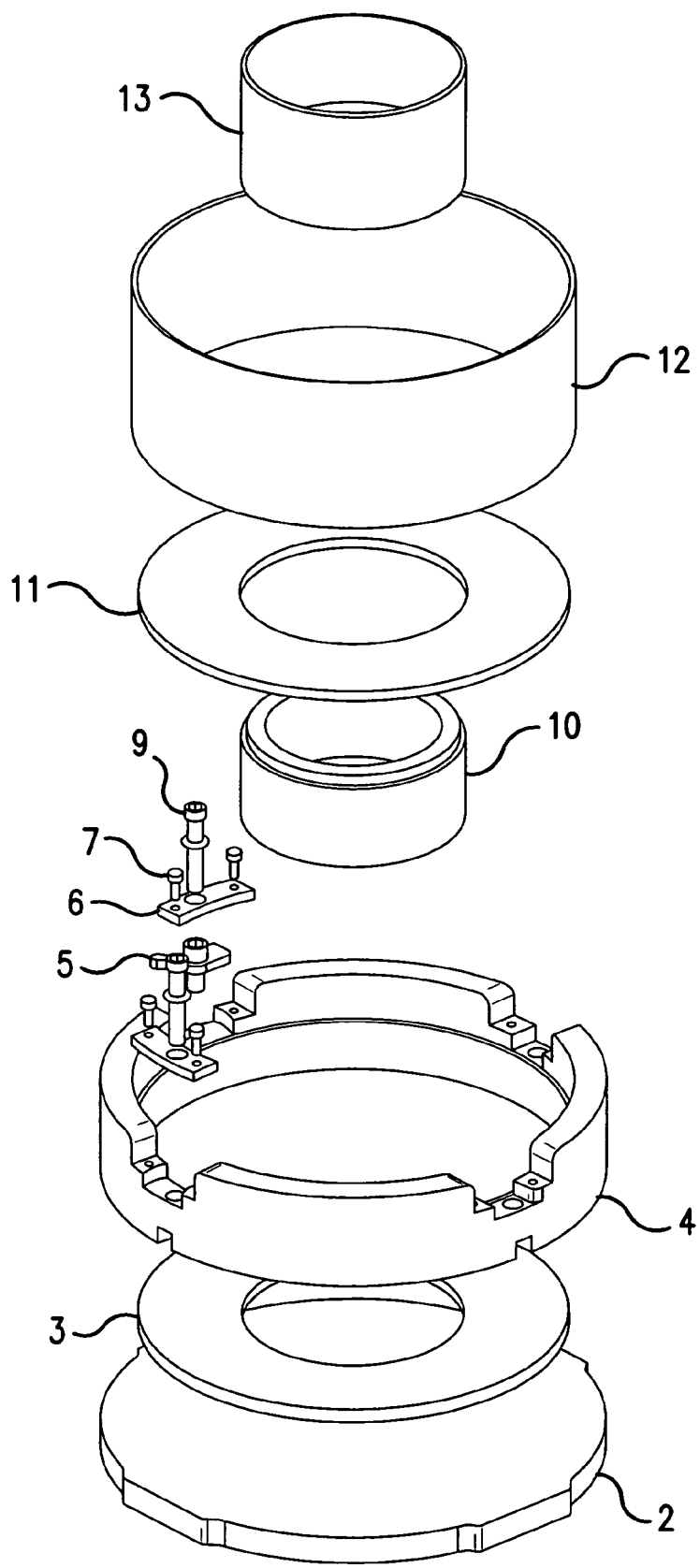
FIG. 1 is an exploded perspective view of a mold incorporating a constraint fixture in accordance with the present invention.

One type of constraint fixture which may be used in the practice of this invention is illustrated in FIG. 1. In the practice of the present invention, the inner surface of wall (12) will be e.g. from 0.125 to 1 inch in diameter larger than the outside diameter of an annular pitch-infiltrated preform to be carbonized in the fixture, and the outer surface of wall (10) will be e.g. from 0.125 inch to 1 inch in diameter smaller than the inside diameter of an annular pitch-infiltrated preform to be carbonized in the fixture. Activated carbon or another suitable inert friable material would be loaded into the gaps between walls (10), (12), and the inside and outside diameters, respectively, of the annular preform situated in the constraint fixture. Another type of constraint fixture that can be used to practice the present invention is the flexible constraint fixture described in application Ser. No. 11/435,763 entitled EXPANDABLE/FLEXIBLE CONSTAINT FIXTURE FOR CARBONIZATION OF CARBON-CARBON PREFORMS, filed on even date herewith.

Referring to the drawings, FIG. 1 shows an exploded perspective view of a mold constraint fixture that can be used in the practice of this invention. The constraint fixture as depicted in FIG. 1 comprises a bottom plate 2, an ejector base plate 3, a mold outer ring 4, a mold inner ring 10, and a top press plate 11. FIG. 1 also identifies locking cams 5, cam retainer plates 6, retainer bolts 7, and cam locking bolts 9. The manner in which two cam retainer bolts 7 and one cam locking bolt 9 connect each cam retainer plate 6 to a corresponding locking cam 5 can be seen from their relative positions in FIG. 1. In this example, the locking cams are turned clockwise to lock the constraint fixture during use, and counter-clockwise to unlock. After a preform being manufactured has been subjected to the pressing step, the locking cams 5 are swung down on the top of press plate 11 and are locked in position by locking bolts (9). Alternatively, a ratcheting device (not shown) can be used to automatically lock the press plate into position once the plate is pressed down to achieve the desired compaction or pressure. Finally, FIG. 1 shows outer wall 12 and inner wall 13.

Figure 2:
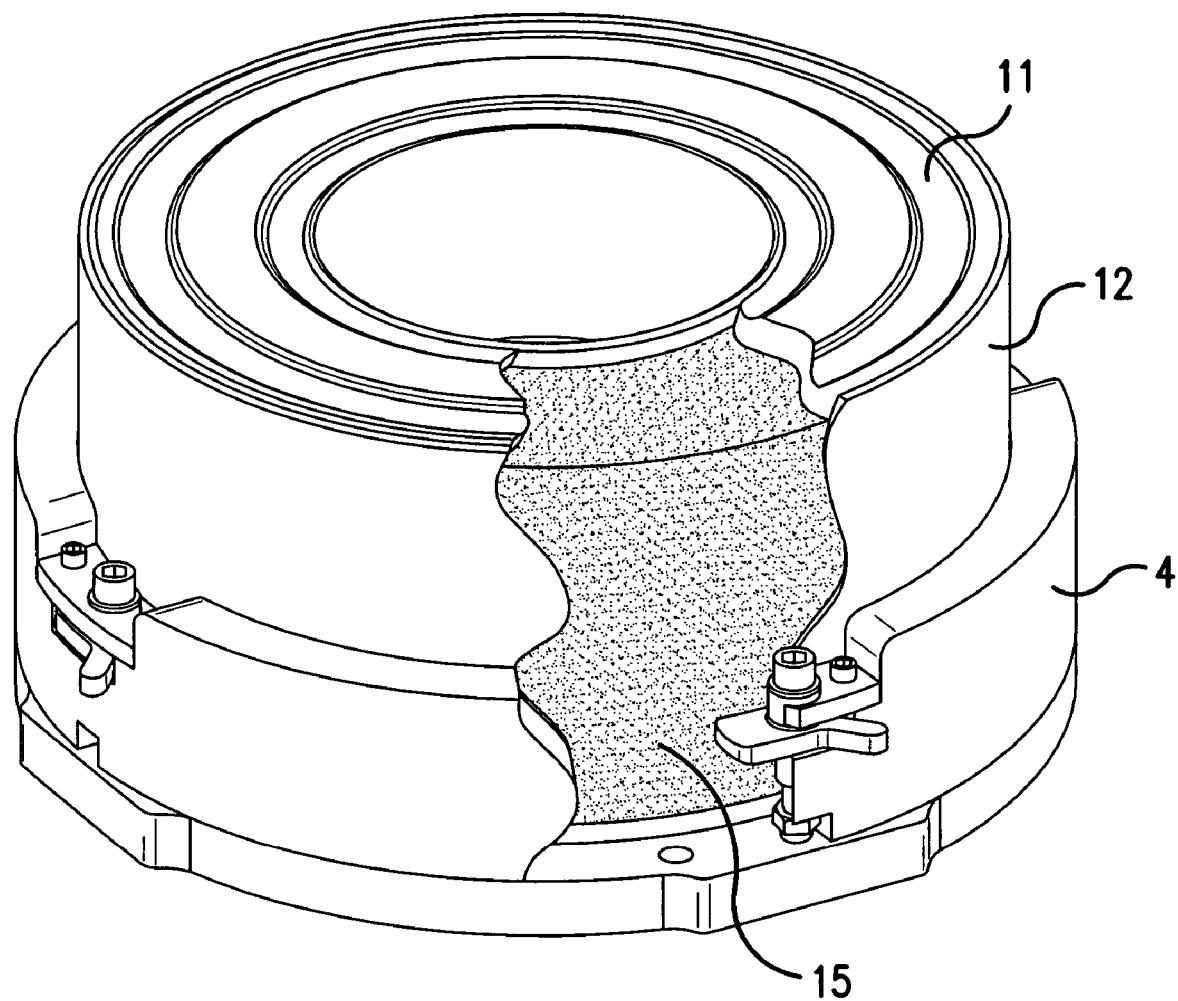
FIG. 2 is a cut-away perspective view of a mold bottom and constraint fixture.

FIG. 2 is a perspective view of a mold constraint fixture, identifying outer ring 4, outer wall 12, and top press plate 11. Also visible in FIG. 2 is a preform 15 inside the mold.

US 2005/0093188 A1, entitled BINDERLESS PREFORM MANUFACTURE, provides more details concerning the configuration and use of such mold constraint fixtures. The entire contents of published application US 2005/0093188 A1 are expressly incorporated by reference herein.

As indicated above, another type of constraint fixture that can be used to practice the present invention is the flexible constraint fixture described in application Ser. No. 11/435,763 entitled EXPANDABLE/FLEXIBLE CONSTAINT FIXTURE FOR CARBONIZATION OF CARBON-CARBON PREFORMS. The entire contents of application Ser. No. 11/435,763 are expressly incorporated by reference herein.

Figure 3A:
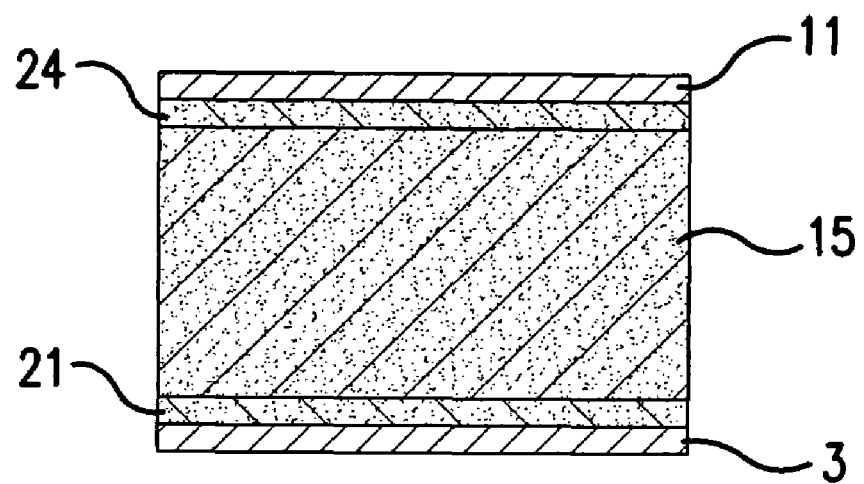
FIG. 3A is a sectional side view of a preform in a constraint fixture surrounded by friable material in accordance with this invention.

FIG. 3A is a sectional side view of a preform in a constraint fixture surrounded by friable material in accordance with this invention. In FIG. 3A, ejector base plate 3 is covered by a layer of friable material 21, preform 15 is located onto of layer 21, and another layer of friable material 24 is located on top of preform 15. Top press plate 11 is situated on top of friable material layer 24.

Figure 3B:
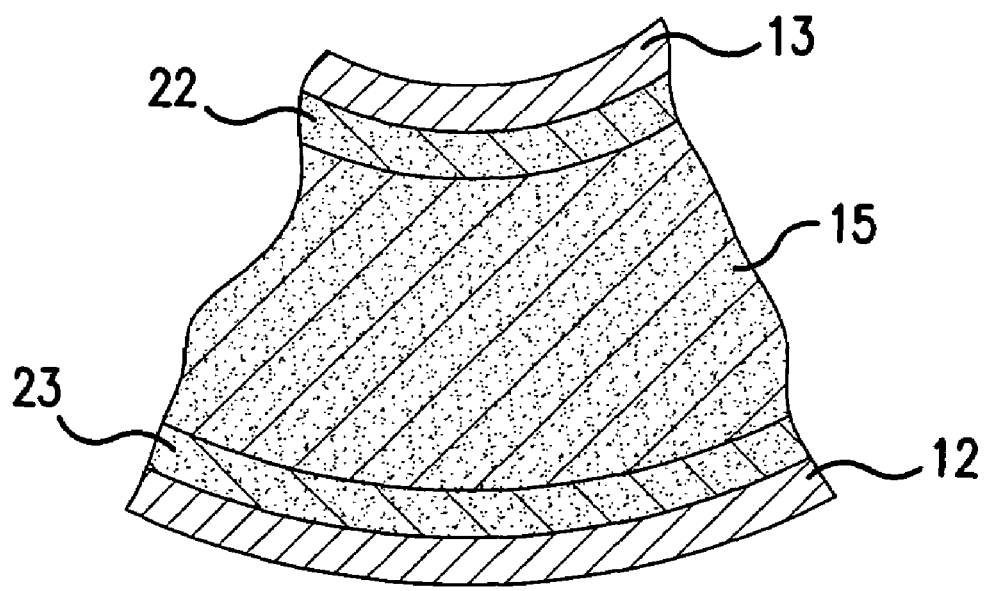
FIG. 3B is a sectional top view of a preform in a constraint fixture surrounded by friable material in accordance with this invention.

FIG. 3B is a sectional top view of a preform in a constraint fixture surrounded by friable material in accordance with this invention. In FIG. 3B, layers of friable material 22 and 23 are located respectively between preform 15 and inner wall 13 and outer wall 12.

Figure 4:
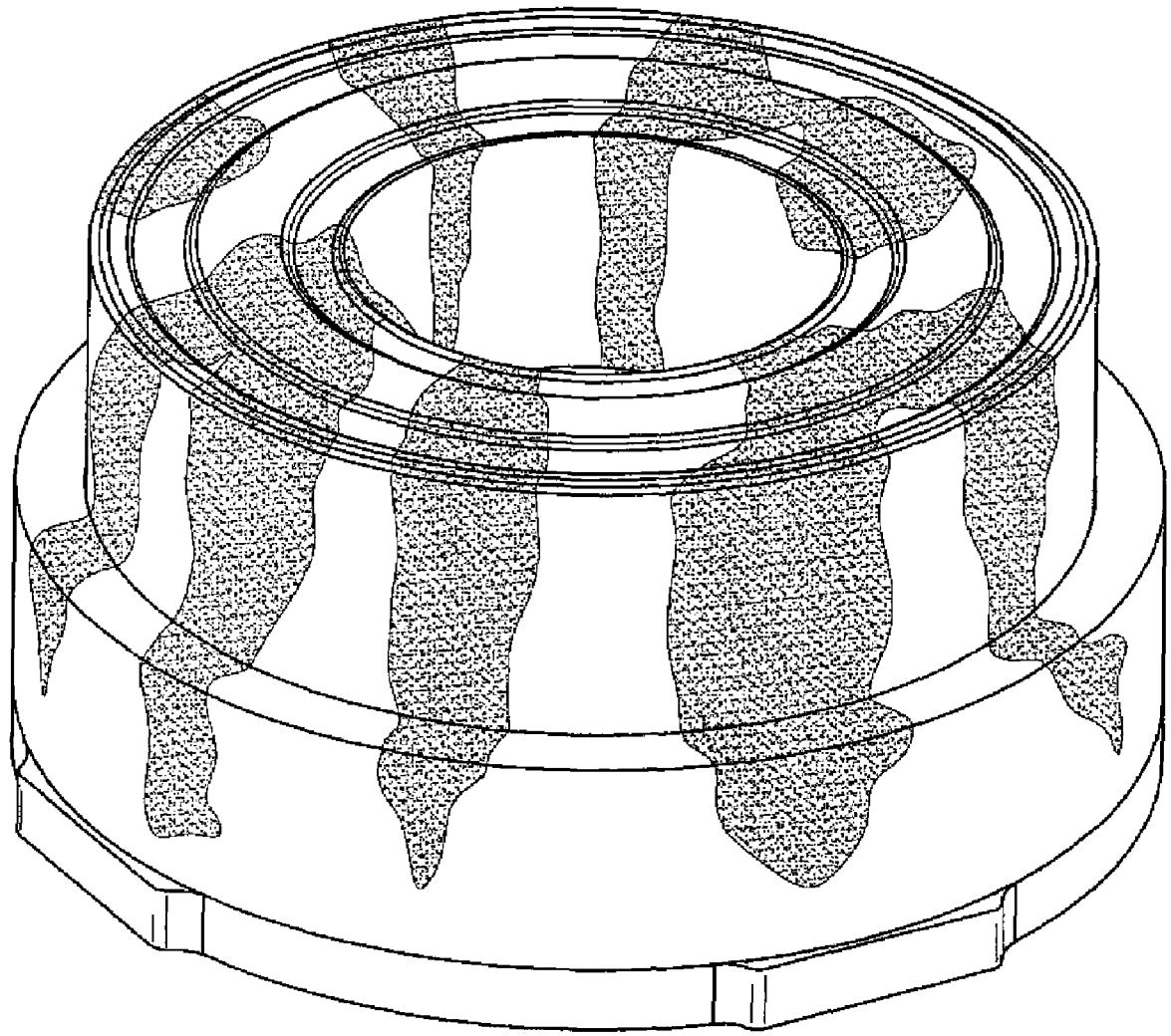
FIG. 4 is a perspective view of a mold bottom and constraint fixture used in conventional (prior art) processing.
Figure 5:
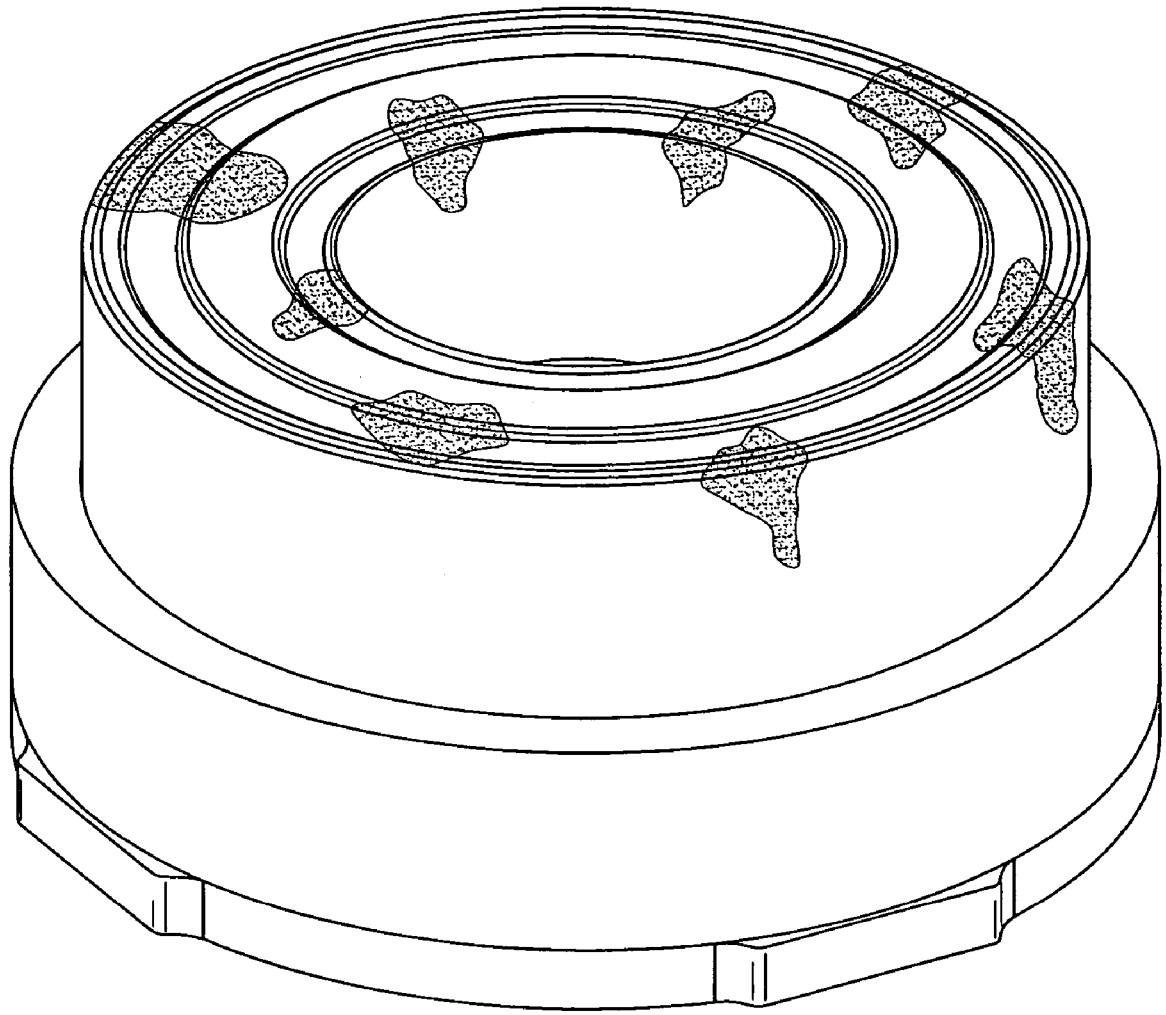
FIG. 5 is a perspective view of a mold bottom and constraint fixture used in processing in accordance with the present invention.

FIGS. 4 and 5 may be compared with one another to illustrate some of the benefits of the present invention. FIG. 4 is a perspective view of a mold bottom and constraint fixture used in conventional (prior art) processing. In FIG. 4, illustrative of the prior art, carbonized pitch can be seen on the inside diameter of the constraint fixture. Patches (layers) of carbonized pitch can be seen on top of the constraint fixture. Overflow carbonized pitch can also be seen on the outside of the constraint fixture. This carbonized pitch may be as much as ¾ inch thick. FIG. 5 is a perspective view of a mold bottom and constraint fixture used in processing in accordance with the present invention. FIG. 5 illustrates that significantly fewer and smaller patches of pitch will be formed inside of, on top of, and outside of the constraint fixture when pitch-infiltrated fibrous annular preforms are carbonized in accordance with the present invention.

For the sake of comparison, comparable pitch-infiltrated fibrous annular preforms may be carbonized by similar processes, with one iteration employing activated carbon in accordance with the present invention and another iteration not employing activated carbon between the preform and the top, bottom, and walls of the constraint fixture. Significantly more (e.g., approximately 50% more) residual carbonized pitch will be found on the outside of the constraint fixture that does not employ activated carbon (illustrated in FIG. 4) than will be found on the outside of the constraint fixture which uses activated carbon in accordance with the present invention (illustrated in FIG. 5). A preform carbonized by the process iteration using activated carbon releases easily from the mold. It does not fall out loosely, but the fixture comes free of the preform with little effort. Less carbonized pitch has to be removed from the constraint fixture in which activated carbon is used before the fixture is re-used. Moreover, removal of carbonized pitch from that constraint fixture is easier than removal of carbonized pitch from the constraint fixture which did not employ activated carbon. The activated carbon reduces the ability of the pitch to bond to the fixture.

This invention has been described hereinabove in terms of preferred or typical embodiments. However, modifications and additions to this invention will be readily apparent to those skilled in the relevant arts upon reading and understanding of the foregoing description. It is intended that all such modifications and additions form a part of the present invention to the extent that they fall within the scope of the several claims appended hereto.

What is claimed is:

1. A method of carbonizing a pitch-infiltrated fibrous annular preform, which method comprises the sequential steps of:

infiltrating a fibrous annular preform with pitch;

placing the pitch-infiltrated annular fibrous preform in a constraint fixture having an ejector base plate, an inner wall, an outer wall, and a top press plate, wherein the relative sizes of the preform and the constraint fixture are selected to leave a gap of ⅛ inch to 1 inch between the preform and the walls of the constraint feature so that a layer of inert friable material may be situated between the preform and walls of the constraint fixture;

placing inert friable material comprised of carbon having a bulk density of from 0.09 g/cc to 0.25 g/cc between the preform and the top press plate, ejector base plate, and walls of the constraint fixture by dusting a layer of the material up to ¼ inch thick onto the ejector base plate, placing the annular preform on top of the layer of material on the base plate, placing the inner wall inside of the annular preform, placing the outer wall around the outside of the preform, pouring the inert friable material into the gaps between the inner and outer walls of the constraint fixture and the preform, dusting a layer of the material up to ¼ inch thick onto the top of the preform, and placing the top press plate on top of the layer of material on top of the preform; and subjecting the pitch-infiltrated fibrous preform to carbonization.

\* \* \* \* \*

UNITED STATES PATENT AND TRADEMARK OFFICE
CERTIFICATE OF CORRECTION

PATENT NO. : 7,632,435 B2  Page 1 of 1
APPLICATION NO. : 11/435734
DATED : December 15, 2009
INVENTOR(S) : Simpson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 625 days.

Signed and Sealed this

Second Day of November, 2010

David J. Kappos
*Director of the United States Patent and Trademark Office*